(12) United States Patent
Lauer (10) Patent No.: US 7,508,582 B2
(45) Date of Patent: Mar. 24, 2009

(54) MIRROR-CHANGING CONFOCAL OPTICAL DEVICE

(76) Inventor: Vincent Lauer, 1 villa de Beauté, Nogent sur Marne (FR) 94130

( * ) Notice: Subject to any disclaimer, the term of this patent is extended or adjusted under 35 U.S.C. 154(b) by 199 days.

(21) Appl. No.: 10/549,426

(22) PCT Filed: Mar. 12, 2004

(86) PCT No.: PCT/FR2004/000626

§ 371 (c)(1),
(2), (4) Date: Dec. 8, 2006

(87) PCT Pub. No.: WO2004/086124

PCT Pub. Date: Oct. 7, 2004

(65) Prior Publication Data

US 2007/0177257 A1    Aug. 2, 2007

(30) Foreign Application Priority Data

Mar. 20, 2003 (FR) .................................. 03 03584
Oct. 28, 2003 (FR) .................................. 03 12697

(51) Int. Cl.
 *G02B 21/00* (2006.01)
(52) U.S. Cl. .................... 359/368; 359/388; 359/634
(58) Field of Classification Search ......... 359/368–390, 359/618–637
See application file for complete search history.

(56) References Cited

U.S. PATENT DOCUMENTS

| 2,359,694 A * | 10/1944 | Turner ........................ 359/386 |
| 3,918,793 A * | 11/1975 | Kraft .......................... 359/389 |
| 5,625,494 A * | 4/1997 | Fukushima .................. 359/634 |
| 6,288,382 B1 * | 9/2001 | Ishihara ................... 250/201.3 |
| 6,545,265 B1 | 4/2003 | Czarnetzki |
| 2002/0027202 A1 | 3/2002 | Engelhardt |
| 2002/0097485 A1* | 7/2002 | Aoshima ..................... 359/368 |

* cited by examiner

Primary Examiner—Thong Nguyen (57) ABSTRACT

Confocal optical device for illuminating points on a sample 807 using illuminating beams FE and for detecting beams FD coming from the illuminated points and passing through a pinholes array 806. An exchangeable block 600 comprising a beamsplitter 602 and a redirection mirror 603 is used to superimpose the optical pathes of the illuminating beams FE and the beams to be detected FD.

11 Claims, 9 Drawing Sheets

MIRROR-CHANGING CONFOCAL OPTICAL DEVICE

FIELD OF THE INVENTION

The invention relates to a confocal optical device comprising a means for changing the beamsplitter that splits the illuminating beam directed towards the observed object from the beam to be detected coming from the observed object.

DESCRIPTION OF THE PRIOR ART

Figure 1:
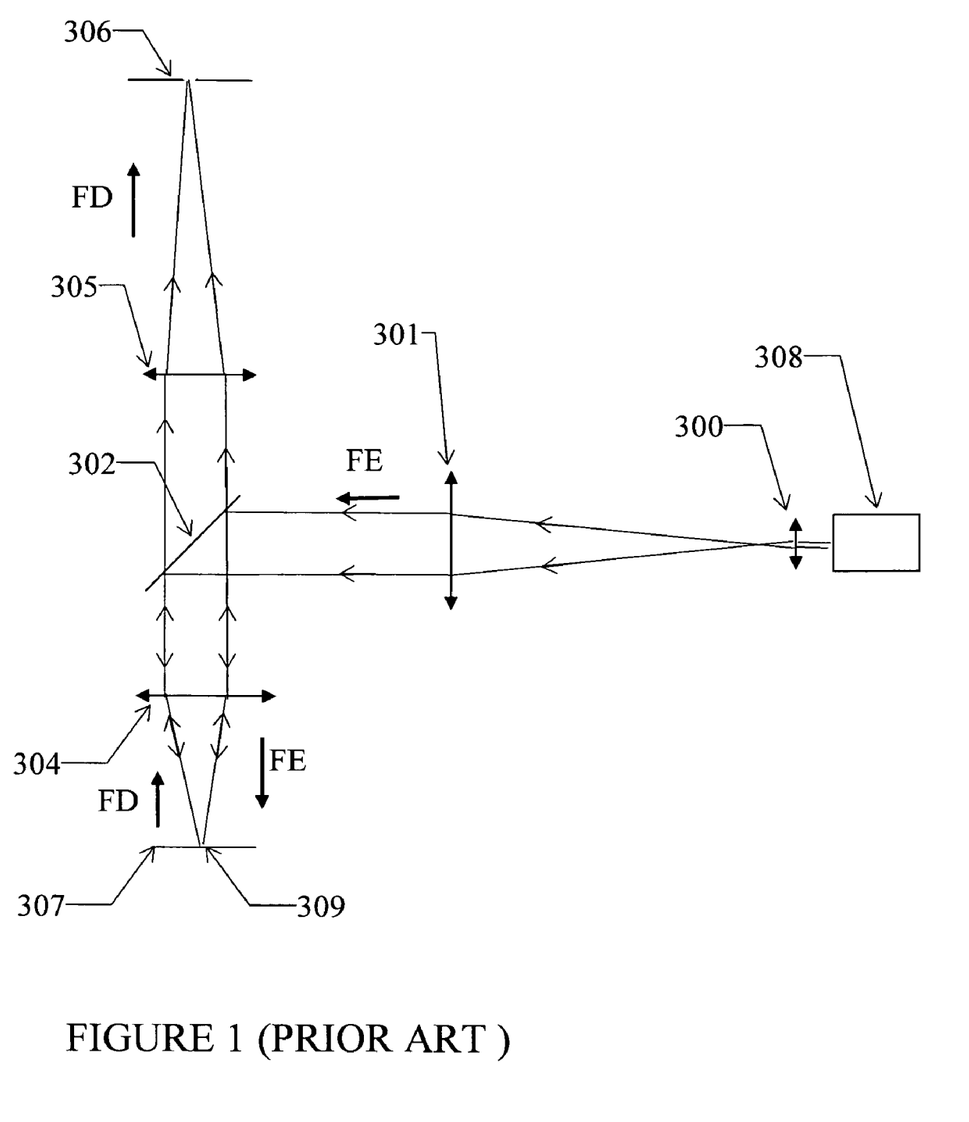
FIG. 1 shows a confocal optical device according to the prior art.

FIG. 1 depicts part of a confocal optical device according to the prior art. A light beam originating from a laser 308 is broadened and collimated by lenses 300, 301. The illuminating beam FE having passed through the lens 301 is substantially parallel. It is then reflected by the partially reflective mirror 302 and sent back towards the lens 304 which can be the objective of the microscope or an intermediate lens. The lens 304 focuses the illuminating beam on an illuminated point 309 on the image plane 307 which can be an intermediate image plane or directly an observed object. The beam to be detected FD returning from the illuminated point passes through the lens 304 again in the reverse direction and passes through the partially transparent mirror 302. It passes through the lens 305 and reaches a microscopic hole 306 which has a filtering action and is placed in a focal plane of the lens 305. In the figure the partially transparent mirror 302 is in an afocal zone, that is to say the illuminating beam and the beam to be detected are substantially parallel in this zone. However, in confocal microscopy, the partially transparent mirror is not necessarily placed in an afocal zone. For example it can also be placed near the microscopic hole. The partially transparent mirror 302 can typically be a dichroic mirror separating the excitation wavelength from the emission wavelengths, in the case of a microscope operating in fluorescence mode, or a beamsplitter that is neutral as regards wavelength, for observing the light reflected by an object to be observed.

For the system to work, the illuminated point 309 must be conjugate with the microscopic hole 306. But the positioning accuracy of the mirror 302 is insufficient to allow such a conjugation to be reproduced reliably when the mirror is replaced by another one or removed and then put back in place. This is because any inaccuracy in positioning the mirror modifies the direction of the illuminating beam reflected by the mirror, and consequently moves the illuminating point which ceases to be conjugate with the microscopic hole. Exchange of the mirror 302 is necessary for example, if it is a dichroic mirror, for modifying the excitation wavelength. There can also be several distinct illuminating light pathes which reach the afocal zone and are each superimposed on the beam to be detected by a partially transparent mirror. In this case, each mirror must be removable, so that an illuminating light path can be used without being interfered with by the mirror corresponding to another illuminating light path.

FIG. 1 does not depict the scanning device which can for example be a pair of galvanometric mirrors or a device for translational movement of the sample. FIG. 1 can be adapted to the case of multipoint illumination by replacing the lens 300 by an array of microlenses, and replacing the microscopic hole 306 by an array of microscopic holes.

The problem of the loss of conjugation between the focusing point of the illuminating beam in the object, which is conjugate with the virtual focusing point of the illuminating laser, and the microscopic filtering hole, during a change of dichroic mirror, is usually solved in various ways:

a) by considerably magnifying the image forming in the plane 306 so as to replace the microscopic hole by a hole with larger dimensions and by placing the dichroic mirror near this hole and not in an afocal zone. This solution appreciably lengthens the optical paths and is not transposable to the case of an array of microscopic holes (multipoint illumination). This is because, in the latter case, magnifying the image implies magnifying the entire array of microscopic holes, which leads to dimensions of the array which are incompatible with the normal dimensions of a confocal device.

b) by providing a system for readjusting the position of the microscopic hole.

c) by combining the preceding solutions in order to avoid readjustments that are too large or too frequent, without excessively lengthening the optical path.

d) by making the illuminating beam pass through the microscopic hole, and placing the dichroic mirror before the microscopic hole on the path of the illuminating beam, and therefore after the microscopic hole on the path of the beam returning from the object. This solution simplifies the system but does not make it possible to adjust the size of the microscopic hole without also affecting the illuminating beam, nor does it make it possible to correct chromatic aberration differences between the illuminating beam and the beam to be detected returning from the observed object. It therefore results in a reduced image quality.

SUMMARY OF THE INVENTION

The aim of the invention is to solve the problem of loss of conjugation between the focusing point 309 of the illuminating beam and the microscopic hole 306 when the beamsplitter 302 is exchanged, while avoiding the shortcomings characterising the techniques mentioned above, and in a way that is compatible with the use of multipoint illumination.

The invention consists of a confocal optical device for illuminating at least one illuminated point using an illuminating beam coming from an illumination source and focused on the illuminated point, and for focusing on a microscopic hole a beam to be detected coming from the illuminated point, comprising a beamsplitter passed through by a first beam and reflecting a second beam, one of the first and second beams being the illuminating beam, and the other being the beam to be detected, the beamsplitter being exchangeable, the device being characterised by the following facts:

it comprises a redirection mirror substantially parallel to the beamsplitter and reflecting the second beam, the beamsplitter and the redirection mirror are attached to one another, so that the redirection mirror and the beamsplitter together constitute a splitter unit, which is exchanged all in one piece at the time the beamsplitter is exchanged.

For example, the beamsplitter can be a dichroic mirror and the redirection mirror can be a reflective-only mirror. The beamsplitter can also be a partially transparent mirror (neutral beamsplitter) or a reflective-only mirror.

If the beamsplitter were positioned independently of the redirection mirror, an error in positioning the beamsplitter would affect the direction of the second light beam, which would therefore not be reproducible when the beamsplitter is removed from the optical path and then put back in place. The fact that the two mirrors are attached results in the direction of the second beam at the output of the splitter unit not being affected by errors in positioning the splitter unit assembly. This is because, after reflection on two mirrors parallel to one another, a light beam retains its initial direction again exactly, irrespective of the angle between the beam and the mirrors. It is also confirmed that an error in positioning the splitter unit translationally does not affect the light beams, so that neither the position nor the direction are affected at the input and output of the splitter unit.

However, the presence of a redirection mirror attached to the beamsplitter and parallel to the beamsplitter is not sufficient to eliminate all sensitivity of the system to errors in positioning the splitter unit thus formed. This is because an error in positioning the splitter unit rotationally results in a corresponding translation of the second light beam, although the direction of this beam remains constant. This translation can result in a loss of optical conjugation between the illuminated point and the microscopic hole.

According to the invention, this problem is solved by placing said beamsplitter and redirection mirror (the splitter unit) in an afocal zone, in which the illuminating beam and the beam to be detected are substantially parallel.

Because the splitter unit is placed in an afocal zone, a direction of the beam at the splitter unit corresponds to a point in a plane where the beams are focused, and therefore the position of such a point (and consequently the conjugation between the focusing point of the illuminating beam and the microscopic hole) is not affected by errors in positioning the splitter unit, both rotationally and translationally.

The invention is adapted to both single-point systems and multipoint systems. However, in the case of multipoint systems, the existing techniques are more difficult to apply, perhaps even impossible in the case of technique (a) mentioned above. The invention is therefore particularly useful for multipoint systems, in which case the optical device according to the invention comprises means for illuminating a plurality of illuminated points using a plurality of illuminating beams, and for focusing on a plurality of microscopic holes a plurality of beams to be detected each coming from an illuminated point, said beamsplitter being passed through by a plurality of first beams, said beamsplitter and redirection mirror reflecting a plurality of second beams, said first beams being the illuminating beams and said second beams being the beams to be detected, or said first beams being the beams to be detected and said second beams being the illuminating beams.

The beamsplitter can be for example a dichroic mirror or a partially transparent mirror neutral as regards wavelength. The redirection mirror is preferably a totally reflective mirror.

In order for it to be possible to exchange the splitter unit, the device according to the invention preferably comprises a plurality of splitter units each consisting of a beamsplitter and a corresponding redirection mirror, and a means for alternately placing one or another of the splitter units on the optical path. This means can be for example a slider or a wheel turning about its axis.

If the beamsplitter and redirection mirror are not perfectly parallel, the direction of the second beam at the output of the splitter unit can be slightly modified with respect to its direction at the input of the splitter unit. So that several splitter units can be exchanged without loss of conjugation between the illuminated point and the microscopic hole, it is necessary that all the exchangeable units generate the same beam direction variations, with very great accuracy. This is difficult to achieve with splitter units comprising several assembled components. According to a preferred version of the invention, the beamsplitter and the redirection mirror are placed on two opposite faces of a parallel window. This window is disposed so that:

the optical path of the second beam comprises successively a first passing-through of the parallel window, a reflection on a first mirror, a second passing-through of the parallel window, a reflection on a second mirror, and a third passing-through of the parallel window, one of the first and second mirrors being the redirection mirror and the other being the beamsplitter, and so that the optical path of the first beam comprises a passing-through of the parallel window and a passing-through of the beamsplitter.

The beamsplitter and the redirection mirror are for example made by depositions of thin coatings on the parallel window. The window must be sufficiently thick to allow effective splitting of the light beams. Under these conditions, good parallelism of the faces of the windows constituting several splitter units is sufficient to ensure the interchangeability of these units. This is easily achievable in an optical workshop. If the windows constituting mutually exchangeable splitter units do not have perfectly parallel faces, the angle between these faces must be the same for all the mutually exchangeable splitter units.

The parallel window allowing splitting of the light beams is part of the invention, in the same way as the confocal device as a whole. The invention therefore also consists of a splitter unit intended for a confocal optical device, characterised by the fact that it consists of a parallel window, a first face of said window comprising a first area on which a dichroic or partially reflective mirror is made by deposition of at least one thin coating, intended to be passed through by a first light beam and to reflect a second light beam, the first face of said window comprising a second non-reflective area, intended to be passed through by the second light beam, a second face of said window, opposite to the first face, comprising a third area on which a redirection mirror is made by deposition of at least one thin coating, intended to reflect the second light beam, the second face of said window also comprising a fourth non-reflective area, intended to be passed through by the first light beam and by the second light beam.

In fact such a splitter unit makes it possible to split a first light beam from a second light beam without altering the direction of these beams. It is intended as a priority to be used in a confocal microscope, but can also be used in other devices requiring the reproducible exchange of a splitter unit not altering the direction of the light beams.

DETAILED DESCRIPTION OF EXEMPLARY EMBODIMENTS

Figure 2:
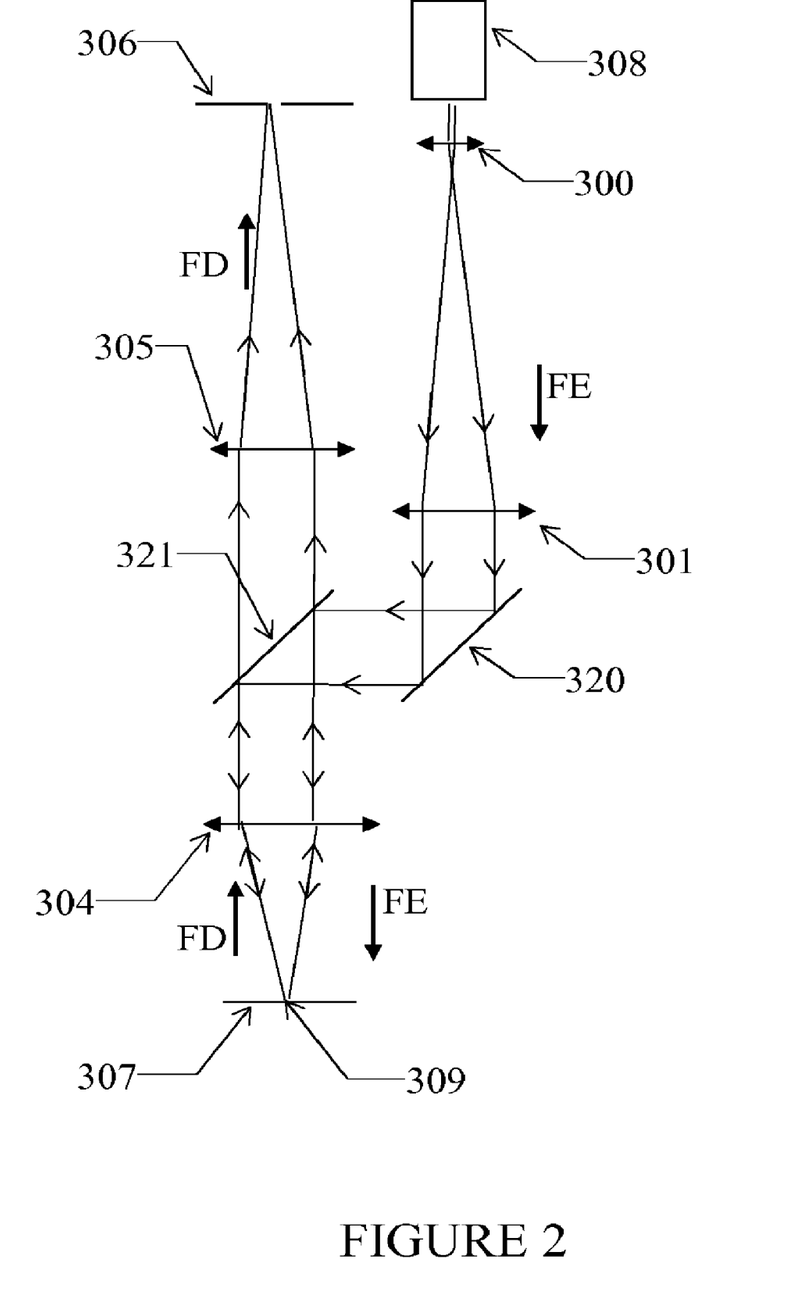
FIG. 2 shows a confocal optical device according to the invention.

FIG. 2 depicts a simple embodiment of the device according to the invention. The system is identical to that of FIG. 1, but the beamsplitter 302 has been replaced by the splitter unit consisting of the beamsplitter 321 and the redirection mirror 320 and situated in an afocal zone.

Figure 3:
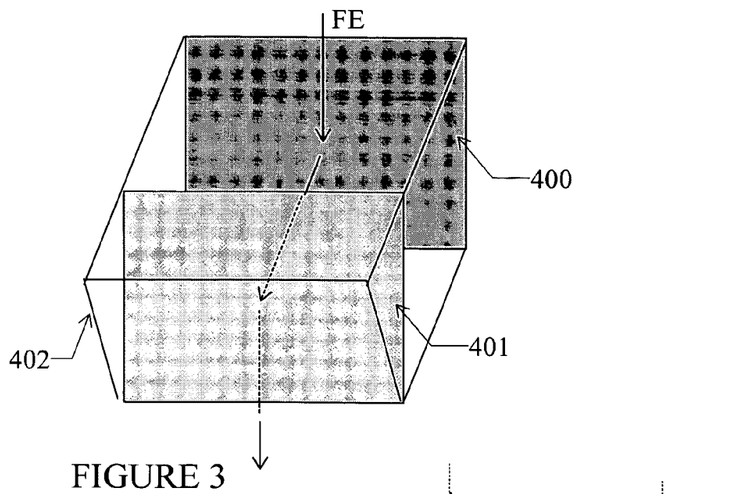
FIG. 3 shows in perspective a splitter unit according to the invention.
Figure 4:
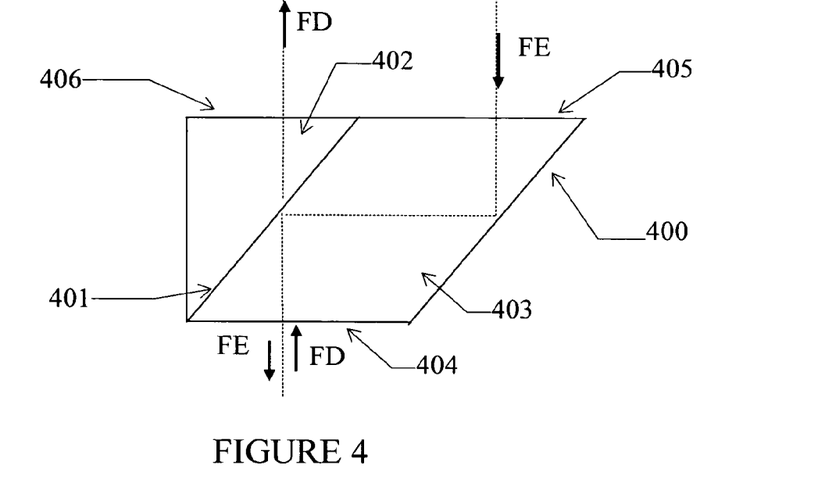
FIG. 4 shows the same splitter unit in cross-section.
Figure 5:
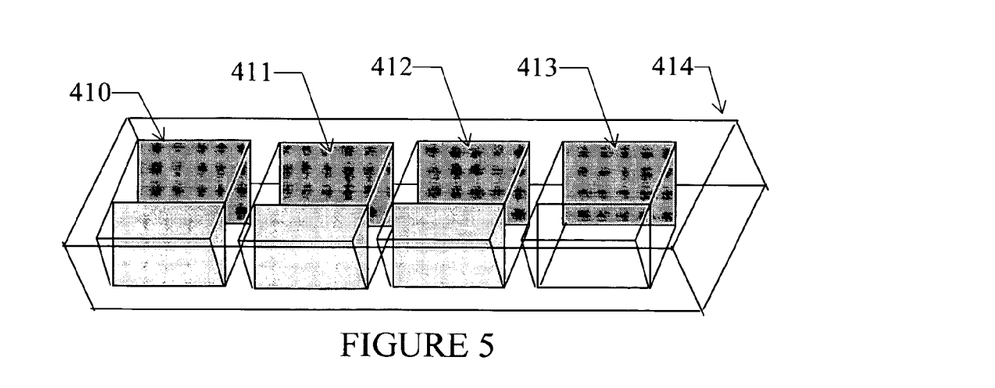
FIG. 5 shows several splitter units associated within a mirror-changing slider.

FIGS. 3 and 4 show one particular embodiment of the splitter unit. This comprises a glass component 403 comprising a surface 401 on which the beamsplitter is made, and a surface 400 on which the redirection mirror is made. It is necessary to use a second glass component 402 so as not to disrupt the beam that passes through the beamsplitter. The optical paths of the illuminating beam FE and detection beam FD have been drawn as dotted lines. As shown in FIG. 5, several independent splitter units 410, 411, 412 can be associated in a slider 414 allowing them to be brought into the optical path one after another.

As a general rule, it is desirable to have precise parallelism between the faces 400 and 401 and between the faces 404 and 406 so that two distinct splitter units direct the beam in the same direction. The faces 404, 406, 405 must also be perfectly parallel to one another.

Figure 6:
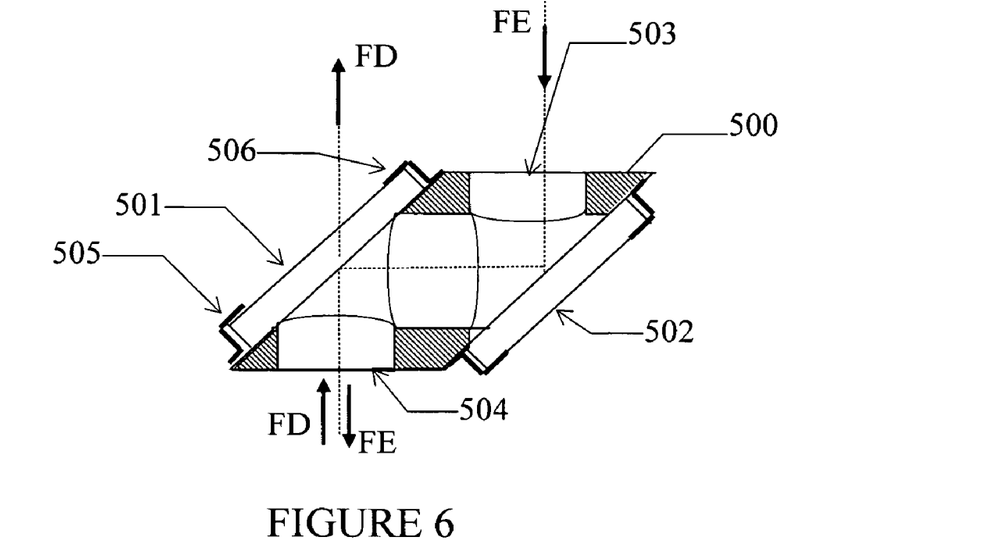
FIG. 6 shows in cross-section another type of splitter unit.
Figure 7:
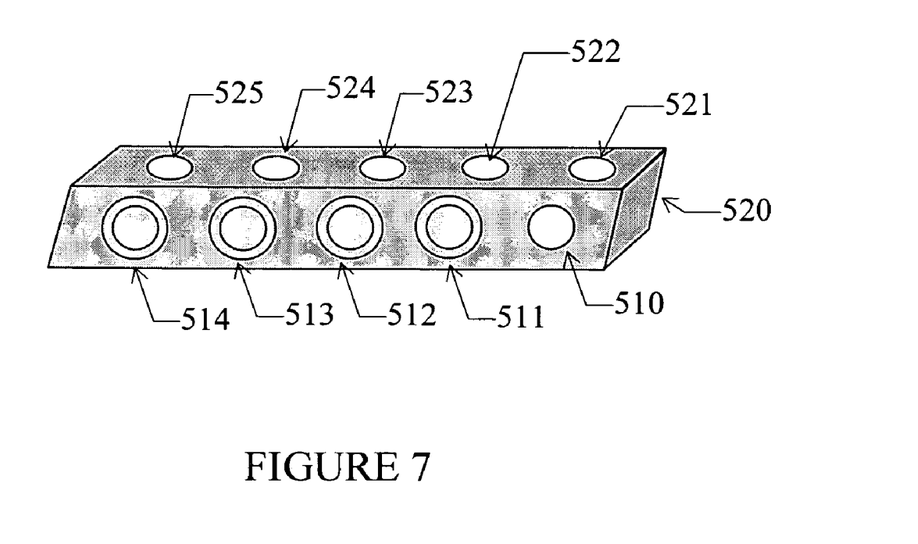
FIG. 7 shows a slider associating several splitter units of the type depicted in FIG. 6.

FIG. 6 shows another type of splitter unit according to the invention. This comprises a support 500 with holes in it for letting the light beam pass through, on which a beamsplitter 501 and a redirection mirror 502 are positioned. The illuminating beam passes through the hole 503, is reflected by the redirection mirror 502, is reflected by the beamsplitter 501, and leaves the device via the hole 504. The mirrors 501 and 502 are made by deposition of a reflective coating on glass windows. They are held resting on the surface of the support 500 by spring steel elements, for example 505 and 506, which apply pressure on the periphery of the mirrors. They can also be fixed by a thin layer of adhesive. If the support 500 is itself made of glass, "molecular bonding" is also possible. Several splitter units can be associated in a single slider. In this case, for these assemblies to be easily interchangeable, the surfaces on which the redirecting mirror 502 and the beamsplitter 501 are respectively positioned must be highly parallel. This constraint can be lessened by making in a single component several supports of the type shown by FIG. 6. For example FIG. 7 shows a multiple support 520, comprising partially transparent mirrors 511 to 514 corresponding to the mirror 501 of FIG. 6, a hole 510, and holes 521 to 525 corresponding to the hole 503 of FIG. 6. Good flatness of the surfaces of the multiple support thus made is in fact sufficient to obtain good reproducibility of the direction of the beam, even when several partially transparent mirrors are used successively and when there is a slight parallelism error between the surfaces of the two mirrors 501, 502. However, it is difficult to put the beamsplitter and redirection mirror in position on their resting surfaces with the necessary accuracy.

Figure 12:
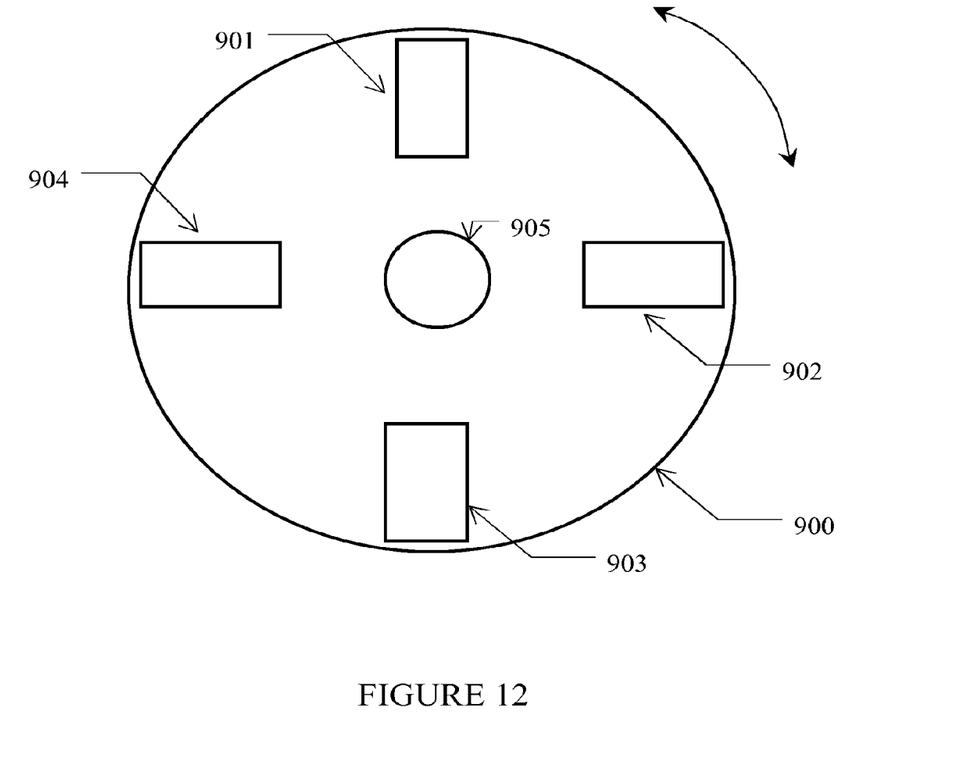
FIG. 12 shows a rotating wheel turning about an axis.

The sliders can be motorised. However, it is also possible to mount several splitter units 901, 902, 903, 904 on a wheel 900 turning about a spindle 905 as shown on FIG. 12, which makes it possible to reduce the friction compared with a slider system and therefore facilitate motorisation.

Figure 8:
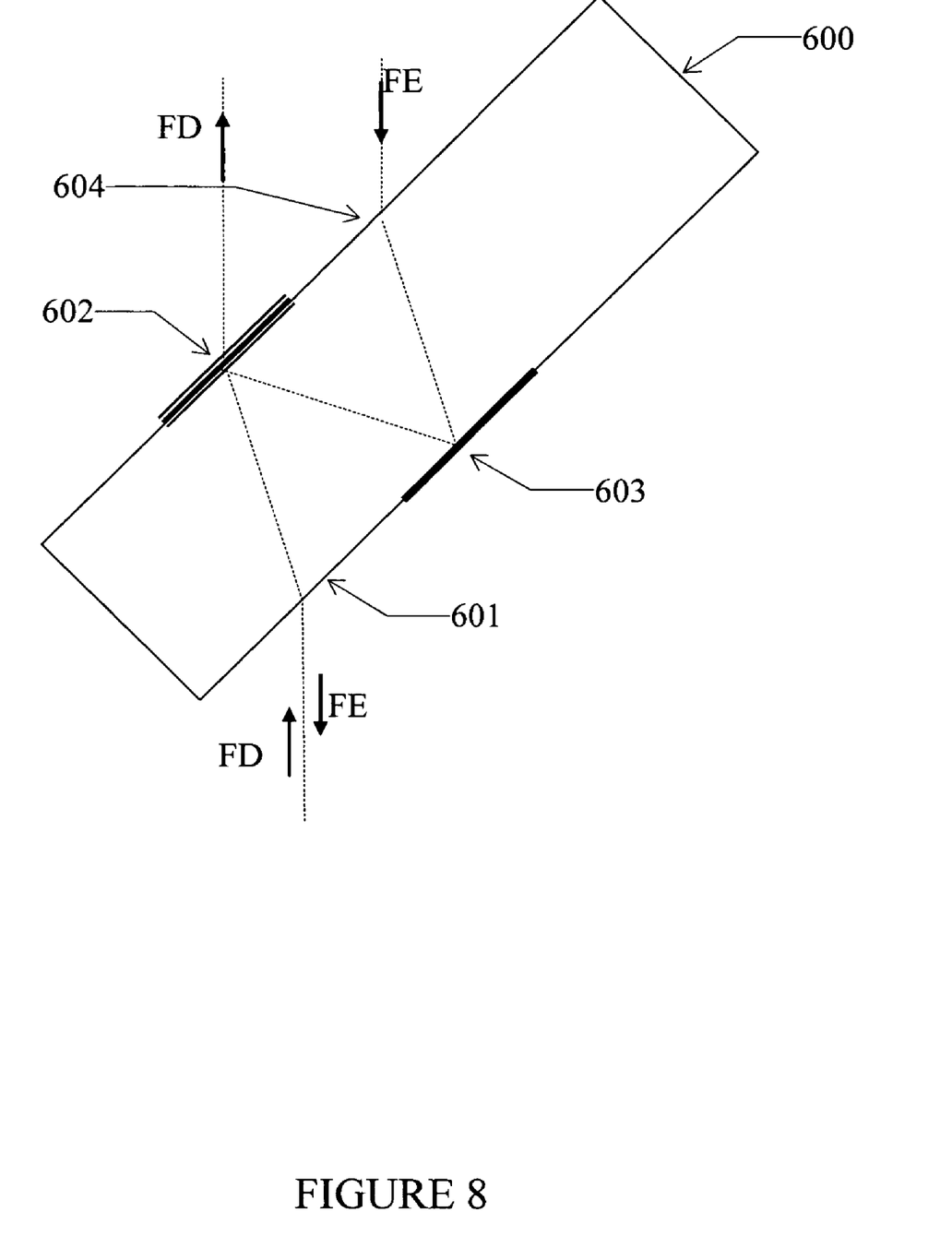
FIG. 8 shows a preferred type of splitter unit.
Figure 9:
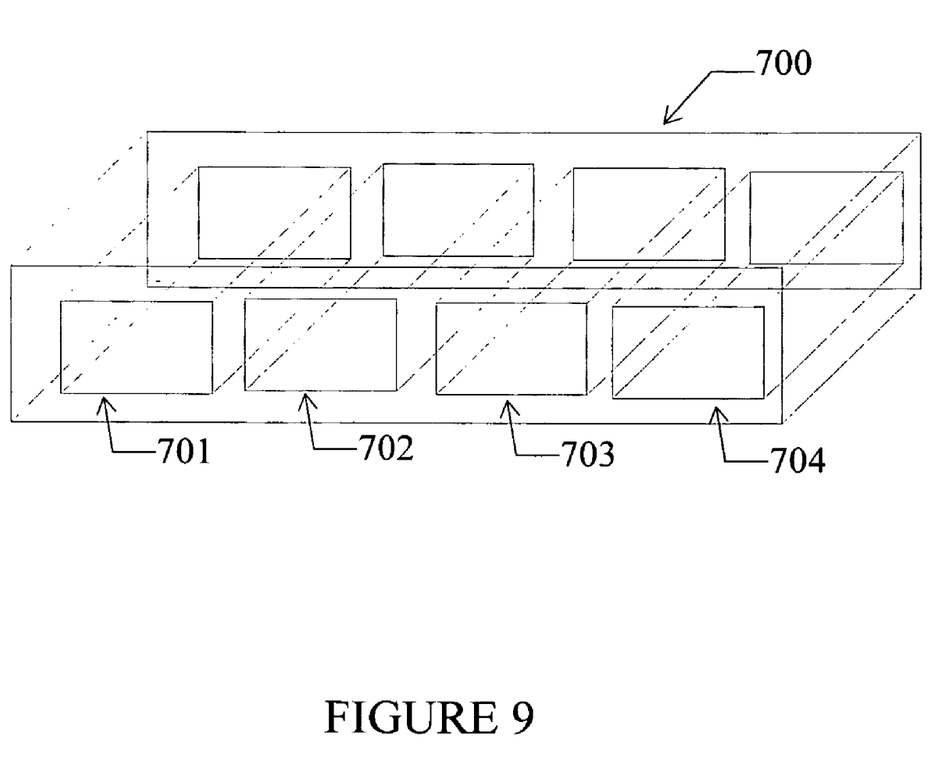
FIG. 9 shows the association in a slider of several splitter units of the type depicted in FIG. 8.

FIG. 8 shows a preferred embodiment of the splitter unit making it easier to manufacture an independent and easily interchangeable splitter unit. In fact, the embodiments described previously are difficult to implement with sufficient accuracy for distinct splitter units to be interchangeable without disrupting the point-to-point conjugation relationships between the different image planes of the device of the invention. The splitter unit depicted in FIG. 8 solves this problem. It consists of a sufficiently thick parallel window 600, on which the beamsplitter 602 is made by deposition of a thin coating (for example a multi-coating deposit in the case of a dichroic mirror) and the redirection mirror 603 is also made by deposition of a thin coating (typically a metallic coating or a multi-coating deposit). The illuminating beam FE enters the parallel window via an area 604 which can be antireflection coated, passes through it and reaches the redirection mirror 603 which reflects it. It again passes through the parallel window and is reflected by the beamsplitter 602. It then passes through the parallel window which it leaves via the area 601 which can be antireflection coated. The beam to be detected FD enters the window via the area 601, passes through it, reaches the mirror 602 and passes through it. As shown in FIG. 9, several splitter units 701, 702, 703, 704 of the type depicted in FIG. 8 can be associated in a slider 700 making it possible to exchange one unit for another. The parallel window can typically be made of glass and the making of two perfectly parallel faces on a glass window does not pose any technological difficulties. The dimensions of the parallel window depend on the width of the beams and can typically be 15 mm (thickness separating the faces bearing the beamsplitter 602 and the mirror 603)×15 mm (width)×45 mm (length). This solution therefore makes it possible to obtain at an acceptable cost easily interchangeable splitter units intended to be mounted on wheels or sliders (for example).

Figure 10:
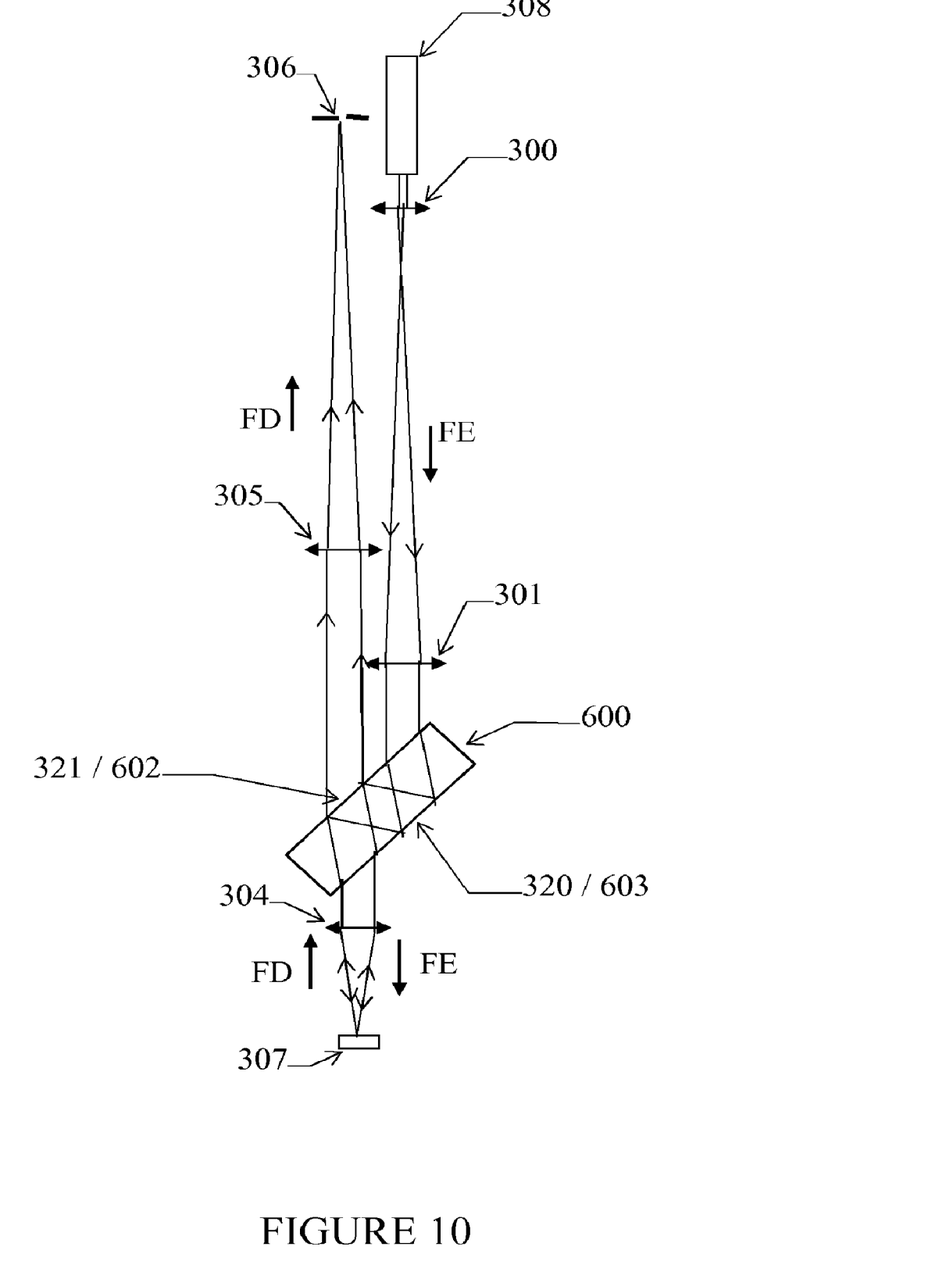
FIG. 10 shows a single-point confocal device according to the invention using the splitter unit of FIG. 8.
Figure 11:
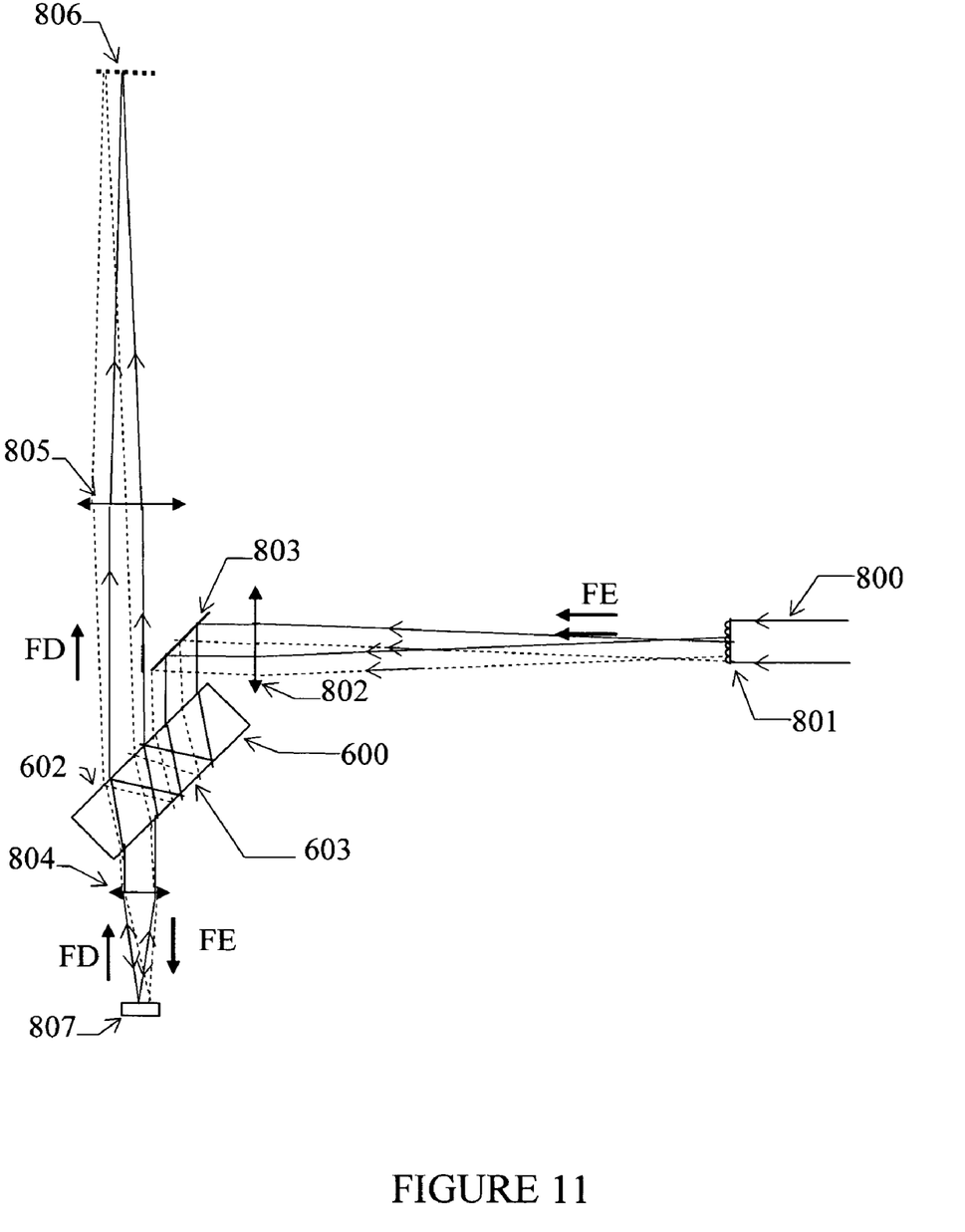
FIG. 11 shows a multipoint confocal device according to the invention using the splitter unit of FIG. 8.

This device generates a lateral shift of the light beams which can be compensated for by a corresponding shift of the lenses of FIG. 2. FIG. 10 is a modification of FIG. 2 for the use of the parallel window 600 described in FIG. 8. The same numbering as in FIG. 2 is used, adding the numbers 602 and 603 used in FIG. 8 and corresponding respectively to the mirrors 321 and 320 of FIG. 2. FIG. 11 depicts a preferred embodiment of the invention in the case of multipoint illumination and use of the splitter unit described in FIG. 8. A collimated laser beam 800 is split by the array of microlenses 801 into a plurality of illuminating beams FE. The figure depicts one of these beams in solid lines and another in dotted lines. The illuminating beams then pass through the lens 802 after which each illuminating beam is substantially parallel. They are reflected by the mirror 803. The illuminating beams then reach the splitter unit consisting of the parallel window 600. They enter the window, are reflected by mirrors 603 and 602, and then leave the window. They pass through the objective 804 and are focused on illuminated points of the object 807. The beams to be detected FD coming from the illuminated points then pass through the objective 804, pass through the parallel window 600 and the mirror 602, pass through the lens 805 and are focused on the holes of the array of microscopic holes 806. The scanning device, which can typically be a galvanometric mirror placed between the parallel window and the objective 804, has not been depicted.

In the figures, the beamsplitter is passed through by the beam to be detected. The beamsplitter may also reflect the beam to be detected and be passed through by the illuminating beam, which does not alter the nature of the invention.

INDUSTRIAL APPLICATIONS

The device of the present invention allows rapid and reliable exchange of the dichroic mirror in confocal microscopes, in particular multipoint ones. This exchange is for example necessary during the observation of cells marked with several fluorescent markers, in order to successively obtain images corresponding to each marker.

The invention claimed is:

1. A confocal optical device for illuminating a plurality of illuminated points (309) using a plurality of illuminating beams coming from an illumination source (308) and focused on said plurality of illuminated points, and for focusing on a plurality of microscopic holes (306) associated with the plurality of illuminated points a plurality of beams to be detected coming from the plurality of illuminated points, comprising:
- a beamsplitter (321) passed through by a first plurality of beams (FD) and reflecting a second plurality of beams (FE), one of the first and second pluralities of beams being the plurality of illuminating beams (FE), and the other being the plurality of beams to be detected (FD),
- a redirection mirror (320) substantially parallel to the beamsplitter and attached to the beamsplitter, the assembly consisting of the beamsplitter and the redirection mirror being exchangeable, and the redirection mirror being disposed to reflect the second plurality of beams.

2. The optical device according to claim 1, characterised by the fact that said beamsplitter and redirection mirror are placed in an afocal zone, in which each illuminating beam and each beam to be detected are substantially parallel.

3. The optical device according to claim 1, characterised by the fact that the beamsplitter (602) and the redirection mirror (603) are placed on two opposite faces of a parallel window (600).

4. The optical device according to claim 3, characterised by the fact that the beamsplitter and the redirection mirror are made by depositions of thin coatings on the parallel window.

5. The optical device according to claim 3, characterised by the fact that the parallel window is disposed so that
- the optical path of the second plurality of beams (FE) comprises successively a first passing-through of the parallel window, a reflection on a first mirror, a second passing-through of the parallel window, a reflection on a second mirror, and a third passing-through of the parallel window, one of the first and second mirrors being the redirection mirror and the other being the beamsplitter, and
- the optical path of the first plurality of beams (FD) comprises a passing-through of the parallel window and a passing-through of the beamsplitter.

6. The optical device according to claim 1, characterised by the fact that said beamsplitter is a dichroic mirror and said redirection mirror is a totally reflective mirror.

7. The optical device according to claim 1, characterised by the fact that said beamsplitter is a beamsplitter that is neutral as regards wavelength and said redirection mirror is a totally reflective mirror.

8. The optical device according to claim 1, characterised by the fact that it comprises a plurality of splitter units each comprising a beamsplitter and a corresponding redirection mirror, and by the fact that it comprises a means for alternately placing one or another of the splitter units on the plurality of illuminating beams.

9. The optical device according to claim 8, characterised by the fact that said means for placing is a slider.

10. The optical device according to claim 8, characterised by the fact that said means for placing is a wheel turning about an axis and on which the splitter units are mounted.

11. The beamsplitter unit intended for a confocal optical device according to claim 1, characterised by the fact that it consists of a parallel window,
- a first face of said window comprising a first area on which a dichroic or partially reflective mirror is made by deposition of at least one thin coating, intended to be passed through by the first plurality of beams and to reflect the second plurality of beams,
- the first face of said window comprising a second non-reflective area, intended to be passed through by the second light beam,
- a second face of said window, opposite to the first face, comprising a third area on which the redirection mirror is made by deposition of at least one thin coating, intended to reflect the second light beam,
- the second face of said window also comprising a fourth non-reflective area, intended to be passed through by the first light beam and by the second light beam.

* * * * *